US012693385B2

(12) United States Patent
Han et al.

(10) Patent No.: US 12,693,385 B2
(45) Date of Patent: Jul. 28, 2026

(54) LIDAR DEVICE

(71) Applicant: HL KLEMOVE CORP., Incheon (KR)

(72) Inventors: HakGu Han, Gyeonggi-do (KR); Ho Seok Shin, Gyeonggi-do (KR); Chul Seung Lee, Gyeonggi-do (KR); Seong Hee Jeong, Gyeonggi-do (KR); Yun Ki Han, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 957 days.

(21) Appl. No.: 17/919,266

(22) PCT Filed: Apr. 16, 2021

(86) PCT No.: PCT/KR2021/004821
§ 371 (c)(1),
(2) Date: Oct. 15, 2022

(87) PCT Pub. No.: WO2021/210952
PCT Pub. Date: Oct. 21, 2021

(65) Prior Publication Data
US 2023/0161004 A1 May 25, 2023

(30) Foreign Application Priority Data
Apr. 16, 2020 (KR) ........................ 10-2020-0046056

(51) Int. Cl.
*G01S 7/481* (2006.01)
*G02B 5/09* (2006.01)
*G02B 26/12* (2006.01)

(52) U.S. Cl.
CPC ........... *G01S 7/4811* (2013.01); *G01S 7/4817* (2013.01); *G02B 5/09* (2013.01); *G02B 26/12* (2013.01)

(58) Field of Classification Search
CPC .............................. G01S 7/4811; G01S 7/4817
See application file for complete search history.

(56) References Cited

U.S. PATENT DOCUMENTS

2019/0064327 A1* 2/2019 Ichiyanagi .............. G01S 17/42
2019/0212419 A1* 7/2019 Jeong ...................... G01S 17/08
(Continued)

FOREIGN PATENT DOCUMENTS

KR 10-2015-0061330 6/2015
KR 10-1603533 3/2016
(Continued)

OTHER PUBLICATIONS

Office Action dated Jan. 20, 2025 for Korean Patent Application No. 10-2022-7034872 and its English translation provided by Applicant's foreign counsel.
(Continued)

*Primary Examiner* — Yuqing Xiao
(74) *Attorney, Agent, or Firm* — WOMBLE BOND DICKINSON (US) LLP

(57) ABSTRACT
A LIDAR device is disclosed. A LIDAR device according to one embodiment of the present invention comprises: a light transmitting unit for transmitting laser light; a light receiving unit for receiving the laser light received by being reflected from the outside; a scanner including a transmitting mirror unit that has a reflective surface for reflecting the laser light transmitted from the light transmitting unit and transmitting the same to the outside, and a receiving mirror unit that has a reflective surface for reflecting the laser light reflected from the outside and transmitting the same to the light receiving unit; and an optical path dividing unit disposed in the vicinity of the scanner so as to block, from flowing into the light receiving unit, scattered light of a propagating laser light reflected from the transmitting mirror unit.

4 Claims, 6 Drawing Sheets

(56)    References Cited

U.S. PATENT DOCUMENTS

| 2020/0150278 | A1* | 5/2020 | Li | G01S 17/931 |
| 2021/0124018 | A1* | 4/2021 | Gassend | G01S 7/481 |
| 2021/0341730 | A1* | 11/2021 | Suzuki | B81B 3/00 |
| 2021/0382147 | A1* | 12/2021 | Chen | G01S 7/4813 |

FOREIGN PATENT DOCUMENTS

| KR | 10-1674062 | 11/2016 | |
| KR | 10-2018-0068714 | 6/2018 | |
| KR | 10-2018-0126964 | 11/2018 | |
| KR | 10-2019-0006119 | 1/2019 | |
| KR | 10-2019-0025115 | 3/2019 | |
| KR | 10-2019-0066349 | 6/2019 | |
| KR | 10-2065640 | 1/2020 | |
| WO | WO-2017082540 A1 * | 5/2017 | G06K 7/10683 |

OTHER PUBLICATIONS

International Search Report for PCT/KR2021/004821 mailed on Aug. 6, 2021 and its English Translation by WIPO (now published as WO 2021/210952).
Written Opinion of the International Searching Authority for PCT/KR2021/004821 mailed on Aug. 6, 2021 and its English Machine Translation by Google Translate (now published as WO 2021/210952).
Office Action dated May 10, 2024 for Korean Patent Application No. 10-2022-7034872 and its English translation provided by Applicant's foreign counsel.

* cited by examiner

1

51 : 51a , 51b , 51 c
53 : 53a , 53b

LIDAR DEVICE

CROSS-REFERENCE TO RELATED APPLICATION

This application claims priority to and the benefit of Korean Patent Application No. 10-2020-0046056, filed on Apr. 16, 2020, the disclosure of which is incorporated herein by reference in its entirety.

TECHNICAL FIELD

The present invention relates to a LIDAR device, and more specifically to a LIDAR device that measures an object or atmospheric phenomenon by using pulsed laser light that is emitted and then reflected and returned.

BACKGROUND ART

The light detection and ranging (LIDAR) device is a radar device that uses laser to detect surrounding objects and atmospheric phenomena. The LIDAR device emits a laser pulse, receives the reflected light from the surrounding target object, and measures the distance to the object, atmospheric phenomenon and the like.

Through the LIDAR device, it is possible to precisely detect surrounding objects and terrain features and model the same as 3D images. Due to these characteristics, the LIDAR device is attracting attention as a core sensor in the autonomous driving technology of a vehicle.

The LIDAR device adopts an optical system having a light transmitting unit and a light receiving unit at the same time, and scattered light is generated in the process of transmitting an optical signal output during light transmission, and the scattered signal is detected by the light receiving unit, and the final signal confirmation stage appears in the form of noise. Due to such noise, the minimum detection distance of the LIDAR device is limited.

In order to solve such a problem, the method of dividing time or dividing a frequency when transmitting or receiving light has been introduced. However, conventional methods such as dividing time, dividing frequency and the like have problems in that they require complex and precise signal processing. Accordingly, there is a need to develop a technique that can fundamentally block the inflow of scattered signals generated during light transmission into a light receiving unit without requiring the complexity of signal processing.

(Patent Document) Korean Patent Application No. 10-2015-0061330 "LIDAR Sensor System", published on Jun. 4, 2015

DISCLOSURE

Technical Problem

The present invention has been devised to solve the problems of prior art described above, and it is an object of the present invention to provide a LIDAR device that blocks a scattering signal generated during the transmission of laser light from flowing into a light receiving unit through physical division of an optical path.

Technical Solution

According to an aspect of the present invention, provided is a LIDAR device, including a light transmitting unit for transmitting laser light; a light receiving unit for receiving the laser light received by being reflected from the outside; a scanner including a transmitting mirror unit that has a reflective surface for reflecting the laser light transmitted from the light transmitting unit and transmitting the same to the outside, and a receiving mirror unit that has a reflective surface for reflecting the laser light reflected from the outside and transmitting the same to the light receiving unit; and an optical path dividing unit disposed in the vicinity of the scanner so as to block, from flowing into the light receiving unit, scattered light of a propagating laser light reflected from the transmitting mirror unit.

In this case, the transmitting mirror unit and the receiving mirror unit may be disposed in different layers, and wherein the optical path dividing unit may include a plate-shaped blocking member which is horizontally disposed at a boundary between the transmitting mirror unit and the receiving mirror unit.

In addition, the transmitting mirror unit and the receiving mirror unit may respectively have a plurality of reflective surfaces, and the scanner may rotate about a fixed axis, and wherein the inner side of the blocking member close to the scanner includes a part formed by being recessed in an arc shape from the inner side to the outer side.

In addition, the outer side of the blocking member may be disposed in contact with a cover window which is disposed to cover a transmission path and a reception path of the laser light.

In addition, a boundary between the transmitting mirror unit and the receiving mirror unit may be perpendicular to the fixed axis.

In addition, the LIDAR device may further include an axis fixing unit which is disposed to surround a part of the scanner to fix the scanner on the fixed axis, wherein the optical path dividing unit may further include a fixing member which is coupled to the axis fixing unit, and wherein the blocking member may be disposed to be connected to the fixing member.

In addition, the scanner may further include a boundary member which is disposed to protrude outward from a boundary between the transmitting mirror unit and the receiving mirror unit.

In addition, the transmitting mirror unit and the receiving mirror unit may be respectively disposed over two or more layers, and wherein the blocking member may be disposed to correspond to each boundary between the transmitting mirror unit and the receiving mirror unit.

In addition, the blocking member may be disposed to correspond to each boundary between each layer of the scanner.

In addition, the light path dividing unit may further include a reinforcing member which extends vertically between the blocking members to prevent the blocking members from sagging.

According to another aspect of the present invention, provided is A LIDAR device, including a light transmitting unit for transmitting laser light; a light receiving unit for receiving the laser light received by being reflected from the outside; a scanner including a transmitting mirror unit that has a reflective surface for reflecting the laser light transmitted from the light transmitting unit and transmitting the same to the outside, and a receiving mirror unit that has a reflective surface for reflecting the laser light reflected from the outside and transmitting the same to the light receiving unit; and an optical path dividing unit disposed in the vicinity of the scanner so as to block, from flowing into the light receiving unit, scattered light of a propagating laser light reflected from the transmitting mirror unit, wherein in the scanner, the transmitting mirror unit includes a first transmitting mirror unit and a second transmitting mirror unit which is disposed below the first transmitting mirror unit, and the receiving mirror unit includes a first receiving mirror unit which is disposed between the first transmitting mirror unit and the second transmitting mirror unit, and a second receiving mirror unit which is disposed between the first receiving mirror unit and the second transmitting mirror unit, and wherein the optical path dividing unit includes a plate-shaped first blocking member which is horizontally disposed at a boundary between the first transmitting mirror unit and the first receiving mirror unit, and a plate-shaped second blocking member which is horizontally disposed at a boundary between the second transmitting mirror unit and the second receiving mirror unit.

In this case, the optical path dividing unit may further include a plate-shaped third blocking member which is horizontally disposed at a boundary between the first receiving mirror unit and the second receiving mirror unit.

In addition, the scanner may further include a first boundary member which is disposed to protrude outward from a boundary between the first receiving mirror unit and the second receiving mirror unit.

In addition, the scanner may further include a second boundary member which is disposed to protrude outward from a boundary between the first transmitting mirror unit and the first receiving mirror unit, and a third boundary member which is disposed to protrude outward from a boundary between the second transmitting minor unit and the second receiving mirror unit.

Advantageous Effects

According to an exemplary embodiment of the present invention, the performance of the LIDAR device can be improved by physically blocking, from flowing into a light receiving unit, scattered light generated in the process of transmitting laser light through an optical path dividing unit which is disposed in the vicinity of a scanner that reflects the laser light.

4

Figure 9:
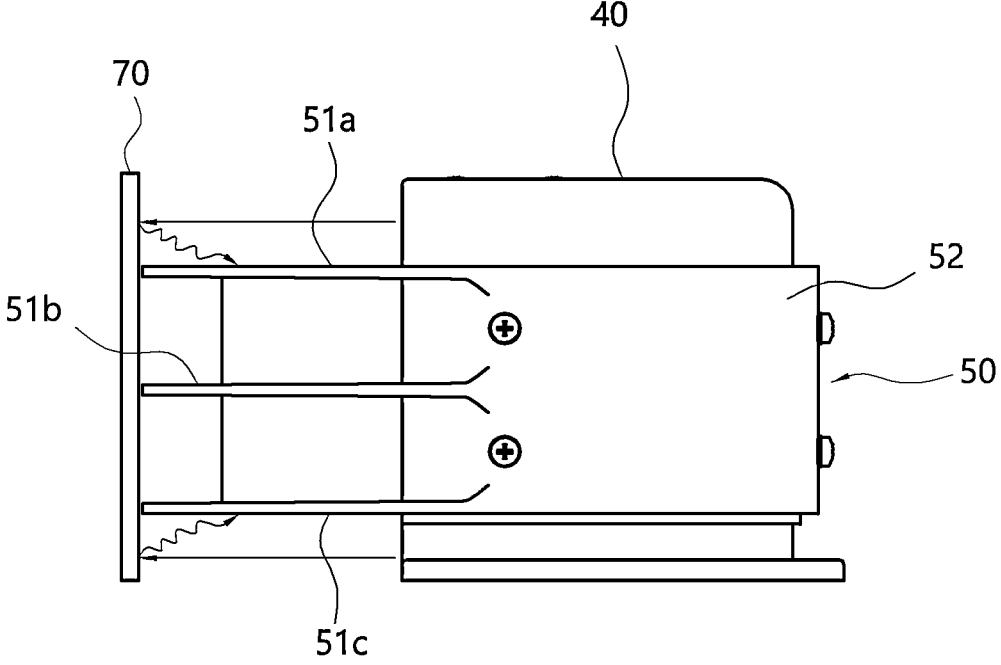

FIG. 9 is a view showing the operation state of the LIDAR device according to another exemplary embodiment of the present invention.

Figure 10:
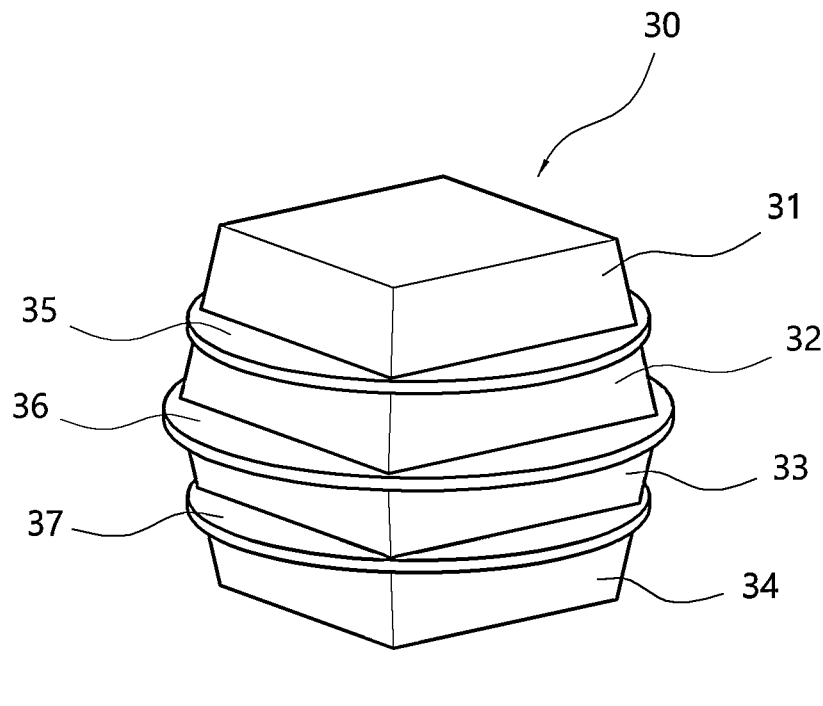

FIG. 10 is a view showing a modified example of the scanner of the LIDAR device according to another exemplary embodiment of the present invention.

MODES OF THE INVENTION

Hereinafter, with reference to the accompanying drawings, the exemplary embodiments of the present invention will be described in detail so that those of ordinary skill in the art to which the present invention pertains can easily practice the present invention. The present invention may be embodied in many different forms and is not limited to the exemplary embodiments described herein. In order to clearly describe the present invention, parts irrelevant to the description are omitted from the drawings, and the same reference numerals are assigned to the same or similar components throughout the specification.

In this specification, terms such as "include" or "have" are intended to describe the existence of features, numbers, steps, operations, components, parts or combinations thereof described in the specification, but it should be understood that it does not preclude the possibility of addition or existence of one or more other features or numbers, steps, operations, components, parts or combinations thereof.

In this specification, spatially relative terms "front", "rear", "upper" or "lower" may be used to describe a correlation with the components shown in the drawings. These are relative terms determined based on what is shown in the drawings, and the positional relationship may be conversely interpreted according to the orientation.

The presence of a component in "front", "behind", "above" or "below" of another component means that, unless otherwise specified, it includes not only being in direct contact with another component and disposed in "front", "behind", "above" or "below", but also cases in which another component is disposed in the middle. In addition, when a component is "connected" to another component, it includes not only direct connection to each other, but also indirect connection to each other unless otherwise specified.

Figure 1:
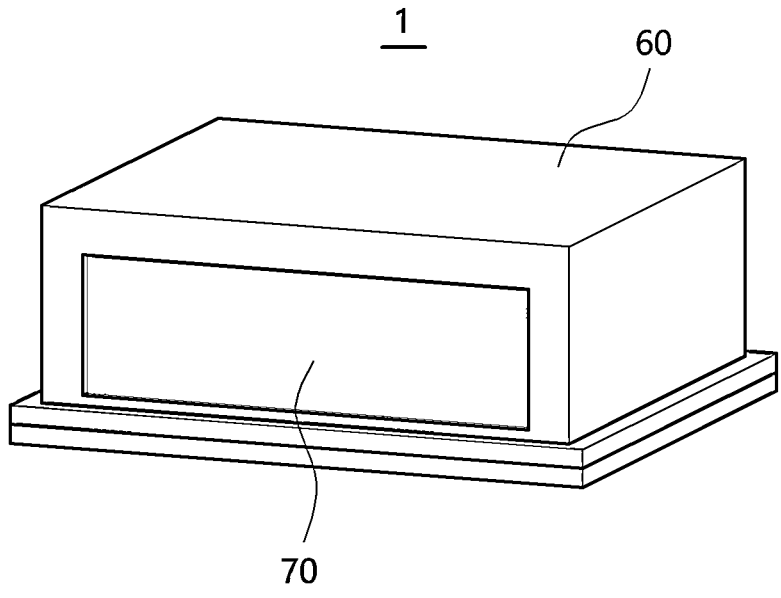
FIG. 1 is a perspective view of the LIDAR device according to an exemplary embodiment of the present invention.

FIG. 1 is a perspective view of the LIDAR device according to an exemplary embodiment of the present invention. In addition, FIG. 2 is a view showing the inside of the housing of the LIDAR device according to an exemplary embodiment of the present invention.

The LIDAR device 1 according to an exemplary embodiment of the present invention is a device that transmits laser light and receives laser light which is reflected back from an external object to measure the distance to the external object. The LIDAR device 1 according to an exemplary embodiment of the present invention may be installed in a vehicle and used as a means for collecting information necessary for driver assistance or autonomous driving of the vehicle.

Figure 2:
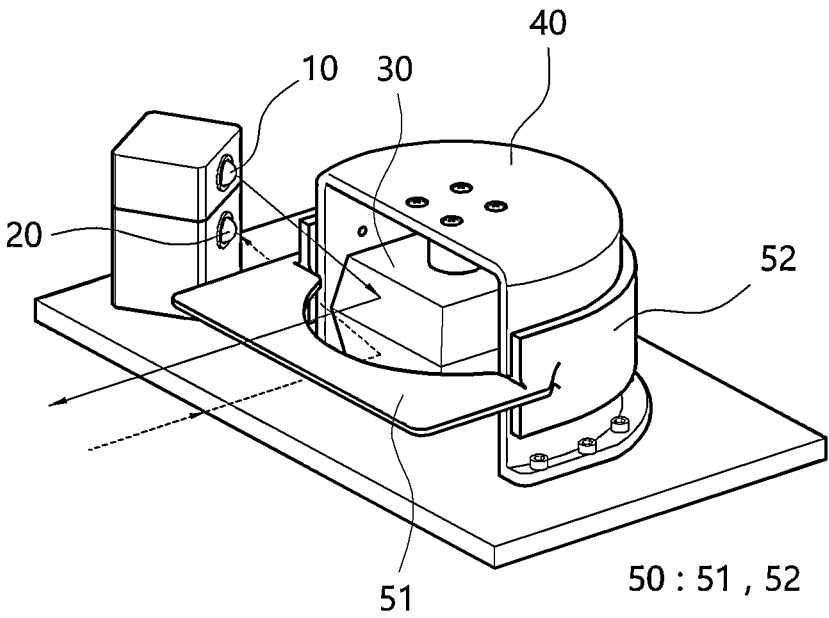
FIG. 2 is a view showing the inside of the housing of the LIDAR device according to an exemplary embodiment of the present invention.

Referring to FIGS. 1 and 2, the LIDAR device 1 according to an exemplary embodiment of the present invention includes a light transmitting unit 10, a light receiving unit 20, a scanner 30, an axis fixing unit 40, an optical path dividing unit 50, a housing 60 and a cover window 70.

In an exemplary embodiment of the present invention, the light transmitting unit 10, the light receiving unit 20, the scanner 30, the axis fixing unit 40 and the optical path dividing unit 50 are disposed inside the housing 60. In addition, one side of the housing 60 through which the transmission path and reception path of the laser light pass is covered by the cover window 70.

The light transmitting unit 10 transmits laser light. In this case, the laser light may be pulsed laser light. The light transmitting unit 10 may include a laser light source that generates pulsed laser light, a transmission optical system that aligns a transmission path of the laser light and the like.

The light receiving unit 20 receives the laser light transmitted from the light transmitting unit 10 and then reflected from the outside and returned. The light receiving unit 20 may include a receiving optical system that aligns paths of received laser light, a photo detector that recognizes laser light received through the receiving optical system and the like.

In detail, the light transmitting unit 10 and the light receiving unit 20 are stacked. The light transmitting unit 10 is disposed above the light receiving unit 20, and the light receiving unit 20 is disposed below the light transmitting unit 10. The light transmitting unit 10 and the light receiving unit 20 are vertically aligned and arranged.

The scanner 30 reflects the laser light transmitted from the light transmitting unit 10 and transmits the same to the outside, and reflects the laser light reflected from the outside and returns to the light receiving unit 20.

Figure 3:
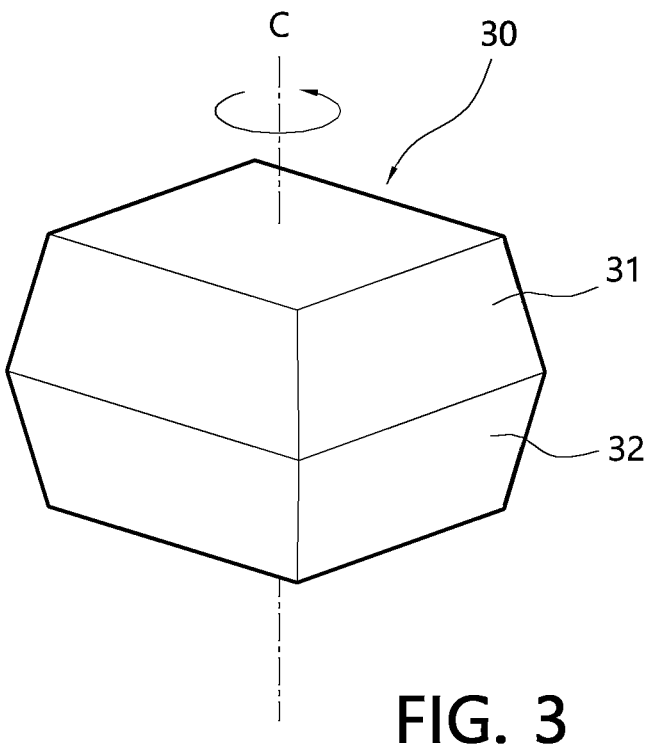
FIG. 3 is a view showing a scanner of the LIDAR device according to an exemplary embodiment of the present invention.

As shown in FIG. 3, the scanner 30 includes a transmitting mirror unit 31 and a receiving mirror unit 32. The transmitting mirror unit 31 has a reflective surface that reflects the laser light transmitted from the light transmission unit 10 and transmits the same to the outside, and the reception mirror unit 32 has a reflective surface that reflects the laser light received from the outside and transmits the same to the light reception unit 20.

The scanner 30 rotates about a fixed axis (C). An actuator (e.g., a motor) for rotating the scanner 30 may be provided inside or below the scanner 30. Specifically, the boundary between the transmitting mirror unit 31 and the receiving mirror unit 32 may be perpendicular to the fixed axis (C).

The scanner 30 has a structure in which polygon mirrors are stacked in multiple layers. In an exemplary embodiment of the present invention, each of the transmitting mirror unit 31 and the receiving mirror unit 32 is formed in a rectangular shape and has four reflective surfaces. Inclination angles with respect to the vertical direction of the reflective surfaces included in each polygonal mirror may be set to be different from each other. More specifically, the inclination angles with respect to the vertical direction of the reflective surfaces included in each polygonal mirror may be configured to be gradually decreased or increased along the rotational direction. Through this configuration, the transmitting mirror unit 31 and the receiving mirror unit 32 may provide a plurality of vertical channels, respectively.

Figure 6:
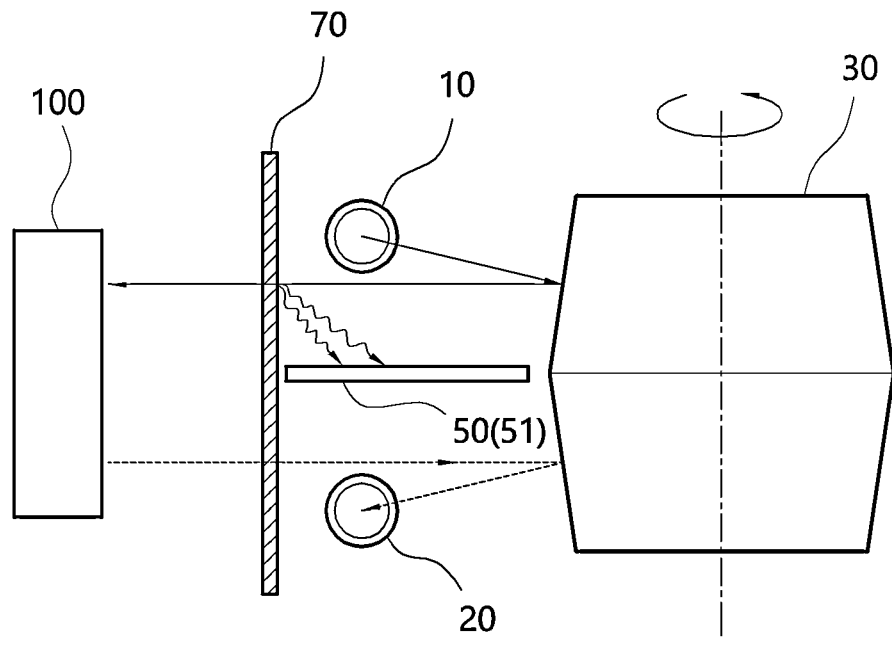
FIG. 6 is a view showing the operation state of the LIDAR device according to an exemplary embodiment of the present invention.
Figure 7:
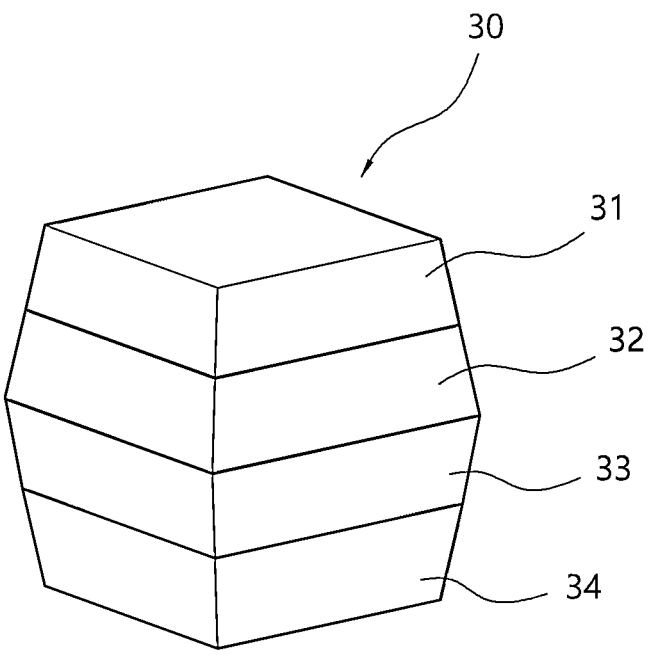
FIG. 7 is a view showing a scanner of the LIDAR device according to another exemplary embodiment of the present invention.

The axis fixing unit 40 fixes the scanner 30 on the fixed axis (C). The axis fixing unit 40 is disposed to surround a part of the scanner 30. Referring to FIGS. 6 and 7, in an exemplary embodiment of the present invention, the axis fixing unit 40 includes a body 41 which is disposed to surround a predetermined area around the scanner 30 within a range that does not interfere with the reflection of the scanner 30, and a bearing portion 42 for rotating and supporting the scanner 30 on the fixed axis (C).

The optical path dividing unit 50 is disposed around the scanner 30 so as to block the scattered light of the laser light reflected from the transmitting mirror unit 31 from flowing into the light receiving unit 20. The optical path dividing unit 50 physically blocks scattered light generated during transmission of the laser light from flowing into the reception path.

Figure 4:
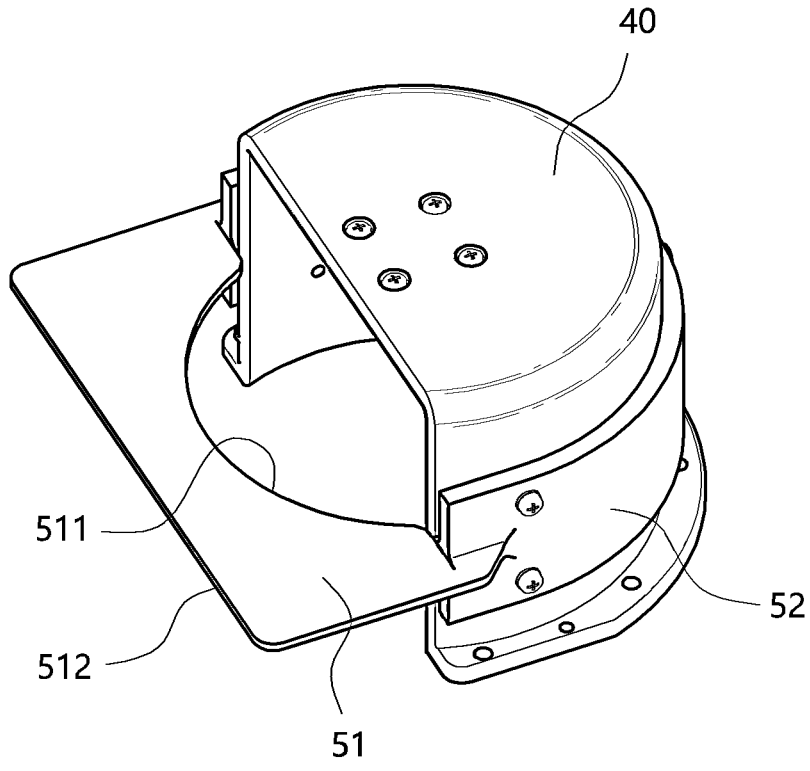
FIG. 4 is a view showing an axis fixing unit and an optical path dividing unit of the LIDAR device according to an exemplary embodiment of the present invention.
Figure 5:
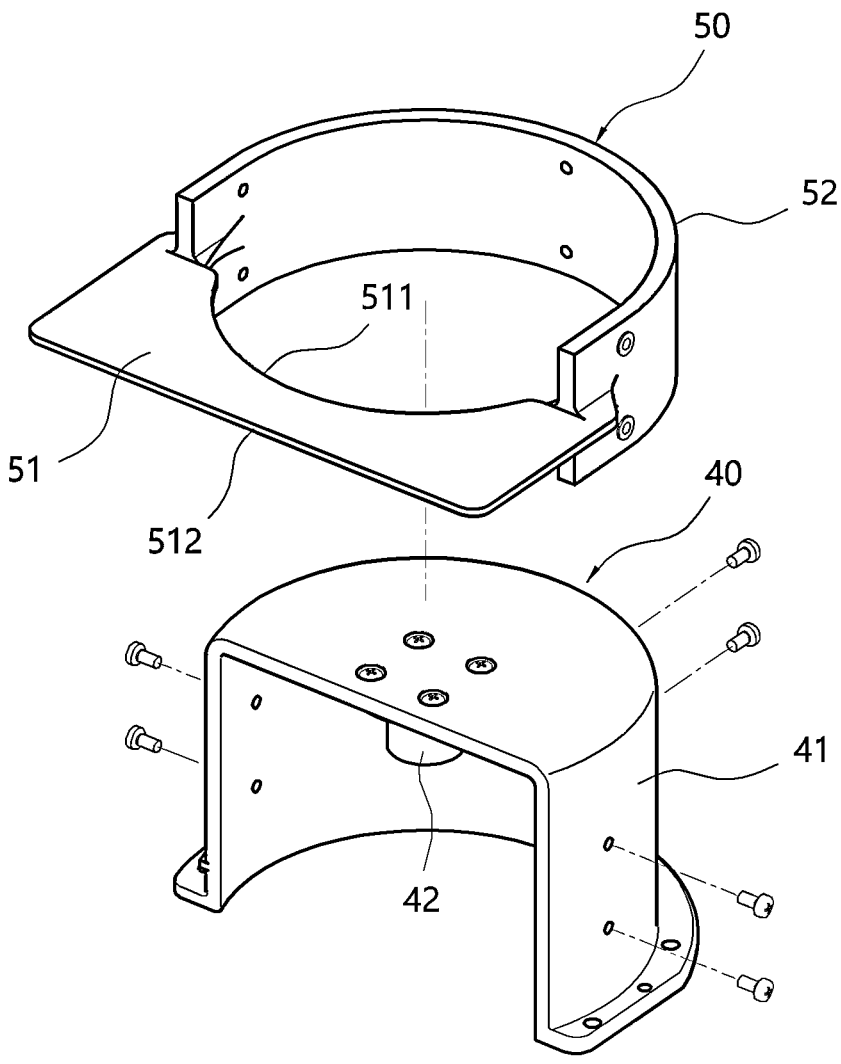
FIG. 5 is an exploded view of FIG. 4.

As illustrated in FIGS. 4 and 5, in an exemplary embodiment of the present invention, the light path dividing unit 50 may include a blocking member 51 and a fixing member 52.

The blocking member 51 is made of a plate-shaped member which is horizontally disposed at a boundary between the transmitting mirror unit 31 and the receiving mirror unit 32 which are disposed on different layers of the scanner 30.

The inner side 511 of the blocking member 51 in the vicinity of the scanner 30 includes an arc-shaped recessed part. In more detail, the inner side 511 of the blocking member 51 in the vicinity of the scanner 30 of the blocking member 51 includes a part formed by being recessed in an arc shape from the inner side to the outer side. As described above, the scanner 30 rotates about the fixed axis (C). In this case, when the inner side 511 of the blocking member 51 is formed in an arc shape along the rotation path, the scattered light may be uniformly blocked when the scanner 30 is rotated. In addition, it is preferable in terms of the blocking efficiency of scattered light that the inner side 511 of the blocking member 51 is disposed as close as possible to the scanner 30 within a range that does not contact the scanner 30 when the scanner 30 is rotated.

Meanwhile, the outer side 512 of the blocking member 51 may be disposed in contact with a cover window 70 disposed to cover the transmission path and the reception path of the laser light. A part of the laser light transmission path having a high probability of generating scattered light is when the laser light is reflected from the transmitting mirror unit 31 of the scanner 30, and when the laser light passes through the cover window 70. However, when the outer side 512 of the blocking member 51 is disposed in contact with the cover window 70, the blocking member 51 may not only block the inflow of scattered light generated when laser light is reflected from the scanner into the reception path, but also the inflow of scattered light generated when laser light passes through the cover window and proceeds to the outside into the reception path.

The fixing member 52 is a member coupled to the axis fixing unit 40 and is connected to the blocking member 51. The blocking member 51 may be fixed around the scanner 30 via the fixing member 52. In an exemplary embodiment of the present invention, the fixing member 52 is formed of an arc-shaped member coupled to the outer peripheral surface of the body 41 of the axis fixing unit 40.

FIG. 6 is a view showing the operation state of the LIDAR device according to an exemplary embodiment of the present invention.

Referring to FIG. 6, it can be confirmed that the scattered light, which is generated when the pulsed laser light transmitted from the light transmitting unit 10 is reflected by the transmitting mirror unit 31 of the scanner 30 and passes through the cover window 70 and proceeds, is blocked from flowing into the reception path of laser light by the blocking member of the optical path dividing unit 50. Meanwhile, the laser light reflected back by the external object 100 is reflected by the receiving mirror unit 32 of the scanner 30 and flows into the light receiving unit 20.

Figure 8:
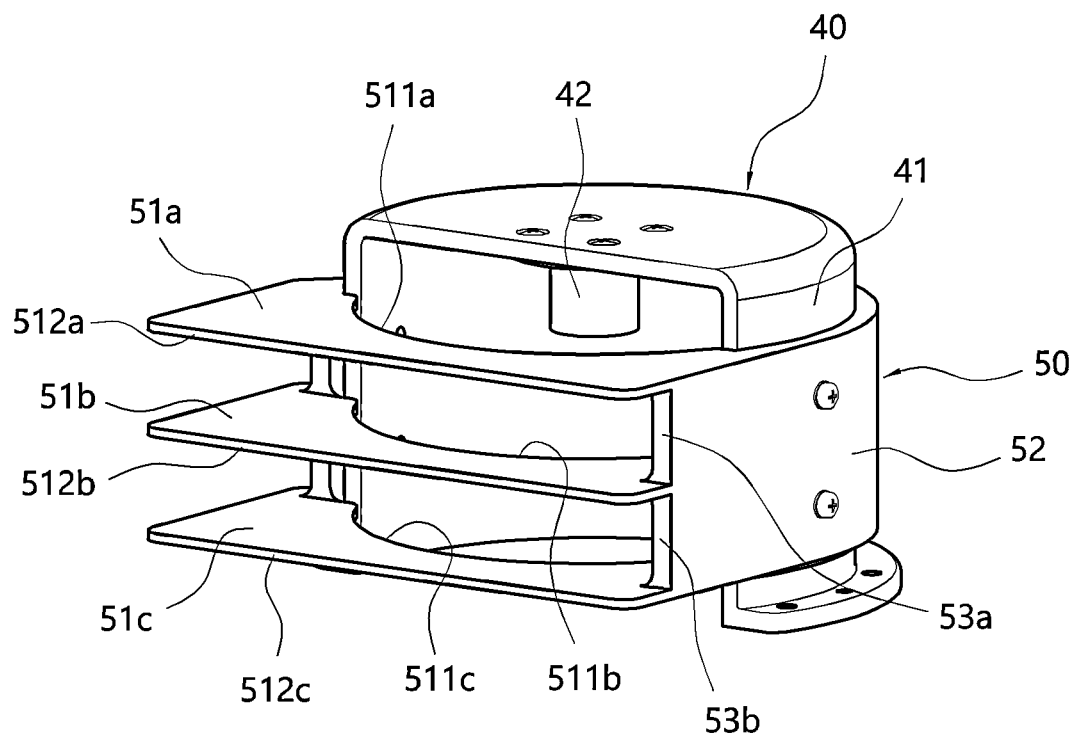
FIG. 8 is a view showing an axis fixing unit and an optical path dividing unit of the LIDAR device according to another exemplary embodiment of the present invention.

FIG. 7 is a view showing a scanner of the LIDAR device according to another exemplary embodiment of the present invention, and FIG. 8 is a view showing an axis fixing unit and an optical path dividing unit of the LIDAR device according to another exemplary embodiment of the present invention. In addition, FIG. 9 is a view showing the operation state of the LIDAR device according to another exemplary embodiment of the present invention. In FIG. 9, the scanner 30 is omitted.

Referring to FIGS. 7 to 9, in another exemplary embodiment of the present invention, the scanner 30 includes a total of four layers. In other words, the scanner 30 has a structure in which a total of four polygonal mirror units are stacked. In this case, the uppermost and lowermost mirror units become a first transmitting mirror unit 31 and a second transmitting mirror unit 34, respectively, and the two-layered polygonal mirror units disposed in the middle may become a first receiving mirror unit 32 and a second receiving mirror unit 33, respectively.

In another exemplary embodiment of the present invention, the blocking member 51 of the optical path dividing unit 50 is coupled to the body 41 of the axis fixing unit 40 by the fixing member 52, and is arranged to correspond to each boundary between the transmitting mirror units 31, 34 and the receiving mirrors 32, 33. That is, the blocking member 51 includes a first blocking member 51*a* which is arranged to correspond to the boundary between the first transmitting mirror unit 31 and the first receiving mirror unit 32, a second blocking member 51*b* which is arranged to correspond to the boundary between the first receiving mirror 32 and the second receiving mirror unit 33, and a third blocking member 51*c* which is arranged to correspond to the boundary between the second receiving mirror unit 33 and the second transmitting mirror unit 34.

As described in relation to an exemplary embodiment of the present invention, the inner sides 511*a*, 511*b*, 511*c* of the first to third blocking members 51*a*, 51*b*, 51*c* are formed in arc shapes along the rotation radius of the scanner 30, and the outer sides 512*a*, 512*b*, 512*c* may be disposed in contact with the cover window 70.

Meanwhile, in another exemplary embodiment of the present invention, the optical path dividing unit 50 further includes a reinforcing member 53 which extends vertically between the blocking members 51 to prevent the blocking members 51 from sagging. The reinforcing member 53 improves the reliability and durability of the optical path dividing unit 50.

Specifically, a first reinforcing member 53*a* is formed between the first blocking member 51*a* and the second blocking member 51*b*, and a second reinforcing member 53*b* is formed between the second blocking member 51*b* and the third blocking member 51*c*. The reinforcing member 53 may be formed in various shapes (e.g., ribs) within a range that does not interfere with the path of laser light.

Meanwhile, in another exemplary embodiment of the present invention, a plurality of the light transmitting units 10 and the light receiving units 20 may be stacked and disposed to correspond to the structure of the scanner 30. That is, the first light transmitting unit may be disposed at the uppermost end, the first light receiving unit may be disposed under the first light transmitting unit, the second light receiving unit may be disposed under the first light receiving unit, and the second light transmitting unit may be disposed at the lowermost end.

FIG. 10 is a view showing a modified example of the scanner of the LIDAR device according to another exemplary embodiment of the present invention.

Referring to FIG. 10, in another exemplary embodiment of the present invention, the scanner 30 includes a first boundary member 35 which is disposed to protrude outward at a boundary between the first transmitting mirror unit 31 and the first receiving mirror unit 32, a second boundary member 36 which is disposed to protrude outward at a boundary between the first receiving mirror unit 32 and the second receiving mirror unit 33, and a third boundary member 37 which is disposed to protrude outward at a boundary between the second transmitting mirror unit 34 and the second receiving mirror unit 33.

The first boundary member 35 and the third boundary member 37 physically block scattered light generated when the laser light is reflected from the reflective surface of the transmitting mirror unit from flowing into the reception path. In addition, the second boundary member 36 blocks scattered light in a doubly auxiliary manner.

The optical system of the LIDAR device 1 according to the exemplary embodiments of the present invention as described above, that is, the detailed configurations of the light transmitting unit 10, the light receiving unit 20 and the scanner 30 are merely an example. The optical system including the light transmitting unit 10, the light receiving unit 20 and the scanner 30 may be changed according to the required performance or usage environment of the LIDAR device. Accordingly, the structure and shape of the optical path dividing unit 50 may be changed as much as possible.

For example, the scanner 30 may be composed of three or more multi-layers, and the number of reflective surfaces of the polygonal mirror disposed on each layer, the angle of each reflective surface with respect to the vertical direction and the like may be modified according to the required performance of the LIDAR device. In addition, the number and arrangement of the light transmitting unit 10 and the light receiving unit 20 may vary according to the shape of the scanner 30, and the light path dividing unit 50 may be modified accordingly.

Although an exemplary embodiment of the present invention has been described, the spirit of the present invention is not limited by the exemplary embodiments presented herein, and those skilled in the art who understand the spirit of the present invention will be able to easily suggest other exemplary embodiments by modifying, changing, deleting or adding components within the scope of the same spirit, but this is also said to be within the scope of the present invention.

The invention claimed is:

1. A LIDAR device, comprising:

a light transmitting unit for transmitting laser light;

a light receiving unit for receiving the laser light received by being reflected from the outside;

a scanner comprising a transmitting mirror unit that has a reflective surface for reflecting the laser light transmitted from the light transmitting unit and transmitting the same to the outside, and a receiving mirror unit that has a reflective surface for reflecting the laser light reflected from the outside and transmitting the same to the light receiving unit; and an optical path dividing unit disposed in the vicinity of the scanner so as to block, from flowing into the light receiving unit, scattered light of a propagating laser light reflected from the transmitting mirror unit, wherein in the scanner, the transmitting mirror unit comprises a first transmitting mirror unit and a second transmitting mirror unit which is disposed below the first transmitting mirror unit, and the receiving mirror unit comprises a first receiving mirror unit which is disposed between the first transmitting mirror unit and the second transmitting mirror unit, and a second receiving mirror unit which is disposed between the first receiving mirror unit and the second transmitting mirror unit, and wherein the optical path dividing unit comprises a plate-shaped first blocking member which is horizontally disposed at a boundary between the first transmitting mirror unit and the first receiving mirror unit, and a plate-shaped second blocking member which is horizontally disposed at a boundary between the second transmitting mirror unit and the second receiving mirror unit.

2. The LIDAR device of claim 1, wherein the optical path dividing unit further comprises a plate-shaped third blocking member which is horizontally disposed at a boundary between the first receiving mirror unit and the second receiving mirror unit.

3. The LIDAR device of claim 1, wherein the scanner further comprises a first boundary member which is disposed to protrude outward from a boundary between the first receiving mirror unit and the second receiving mirror unit.

4. The LIDAR device of claim 3, wherein the scanner further comprises a second boundary member which is disposed to protrude outward from a boundary between the first transmitting mirror unit and the first receiving mirror unit, and a third boundary member which is disposed to protrude outward from a boundary between the second transmitting mirror unit and the second receiving mirror unit.

\* \* \* \* \*